Jan. 17, 1956 W. C. ANDERSON 2,731,227
GUY ROD CLAMP FOR BRACKET ARM
Filed April 16, 1951 2 Sheets-Sheet 1
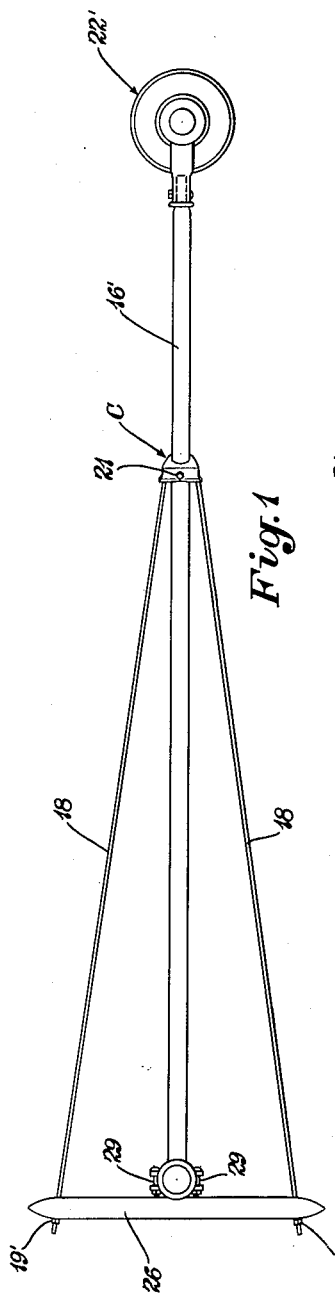
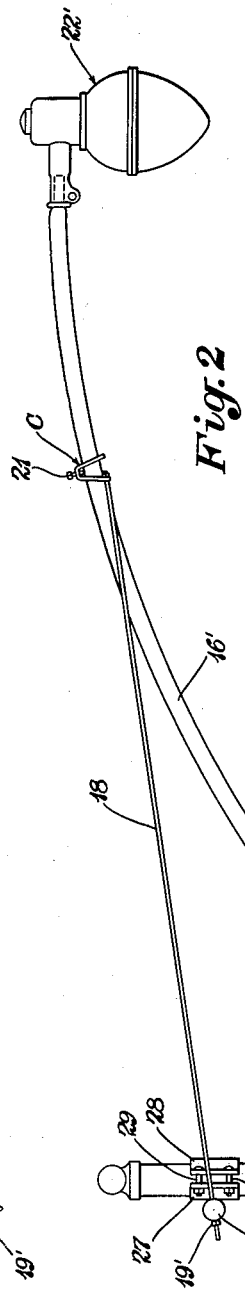
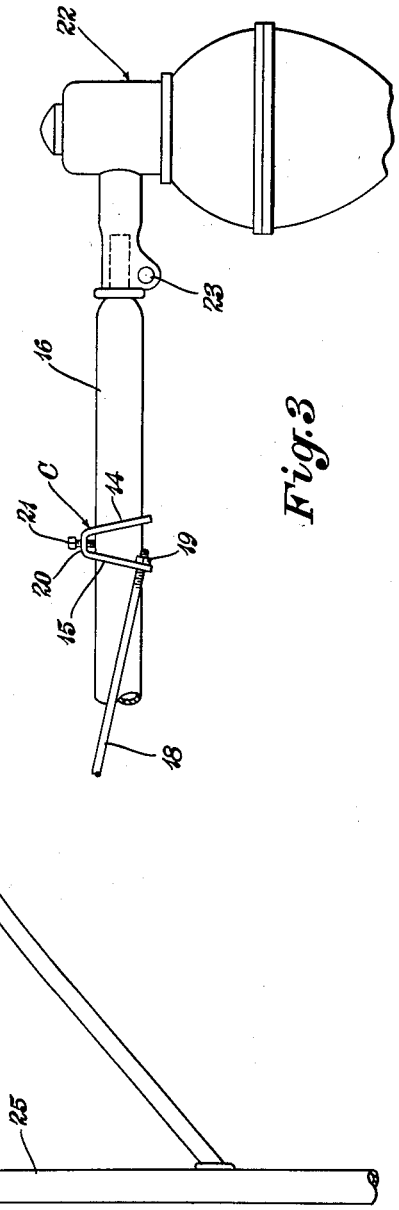
INVENTOR.
W. Carl Anderson
BY
Frease, Bishop & Hamilton
ATTORNEYS

United States Patent Office 2,731,227
Patented Jan. 17, 1956

2,731,227
GUY ROD CLAMP FOR BRACKET ARM

W. Carl Anderson, Canton, Ohio, assignor to The Union Metal Manufacturing Company, Canton, Ohio, a corporation of Ohio Application April 16, 1951, Serial No. 221,305

1 Claim. (Cl. 248—221)

The invention relates generally to clamps for gripping an elongated member such as a pipe, and more particularly to a clamp for securely attaching a guy rod from a pole to a laterally extending bracket arm at any desired location along the arm.

Bracket arms, extending laterally from poles for supporting street lights or the like, require bracing to make the arms substantially rigid. A convenient and efficient type of brace is a pair of guy rods diverging from the arm to a cross piece on the pole, for relieving the load on the arm at its joint with the pole. An ordinary two-part clamp bolted to the arm has been used for attaching the ends of the guy rods thereto, but such clamp has not been satisfactory because when the rods are drawn up to be under tension the clamp tends to slip along the arm, and this puts excessive stress on the joint between the arm and the pole.

The use of an ear or bracket, secured to the arm as by welding for attaching the guy rods, is not satisfactory for two reasons. First, such a bracket attached by welding should be galvanized or similarly coated to protect it against corrosion, and because of the welding operation it would have to be galvanized after attachment to the arm, which would be an expensive operation. Second, while the length of the guy rods does not vary, the location of the attachment of the rods to the arm varies with different installations, because of varying pole diameters and because of different angles between the guy rods and the pole.

Therefore, it is an object of the present invention to provide a novel clamp for attaching guy rods to a laterally extending bracket arm at any desired location along the arm.

Another object is to provide a novel clamp for attaching guy rods to a bracket arm at any desired location along the arm without allowing any slippage.

A further object is to provide a novel clamp for attaching guy rods to a bracket arm, the clamp being so constructed and arranged as to grip the arm the more tightly as tension on the rods is increased.

A still further object is to provide a novel one-piece clamp which is simple and inexpensive to construct, and which is quickly and easily attached without special skill or tools at any desired location along a bracket arm.

These and other objects are accomplished by the parts, constructions, combinations and arrangements comprising the present invention, a preferred embodiment of which is illustrated in the accompanying drawings and described in the specification as exemplifying the best known mode of carrying out the invention, the nature of the improvements being set forth in the following general statement, and the scope of the invention being defined in the appended claims.

In general terms, the invention comprises a one-piece clamp made from a flat plate bent into V-shape with aligned circular openings in the legs preferably disposed at right angles to the planes of the legs, the legs engirdling a bracket arm at inclined angles, guy rods being attached to the outer end of one leg on opposite sides of the arm, and there being a set screw in the apex of the clamp for abutting the bracket arm.

Referring to the drawings, in which a preferred embodiment of the novel clamp is shown by way of example;

Figure 1 is a plan elevation showing the novel clamp used for attaching guy rods to a curved pipe bracket arm joined at its inner end to the side of a pole and supporting a lamp at its outer end;

Fig. 2 is a side elevation thereof;

Fig. 3 is an enlarged fragmentary elevation similar to Fig. 2 showing the novel clamp applied to a straight pipe bracket arm;

Similar numerals refer to similar parts throughout the several views of the drawings.

Figure 5:
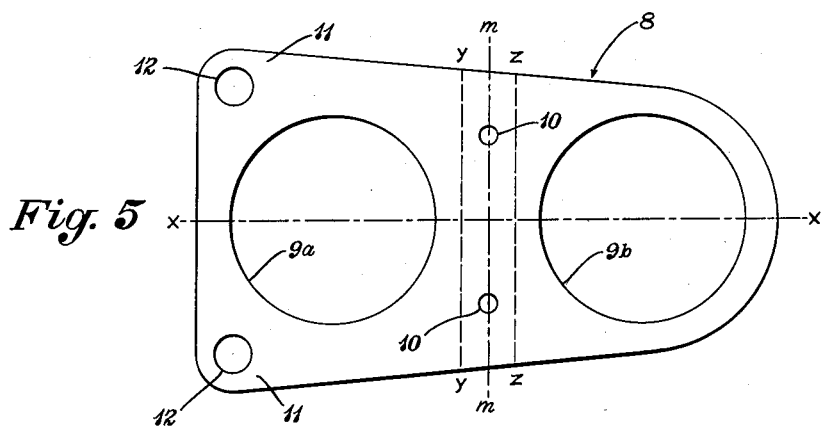
Fig. 5 is a plan view of the flat plate before being bent to form the novel clamp.

Referring first to Fig. 5, the plate blank indicated generally at 8 from which the clamp is to be formed is provided with two large circular openings indicated at 9a and 9b which are both located on the longitudinal center line x—x of the blank, and are preferably disposed at right angles to the plane of the blank. The blank is designed to be bent along the parallel dash lines y—y and z—z extending at right angles to the center line x—x and spaced equally on both sides of the median line m—m which is midway between the circular openings 9a and 9b. Small tooling holes 10 may be provided on the median line for holding the blank in position during the bending operation in a suitable apparatus.

As shown in Fig. 5, the outer periphery of the blank follows the curve of the opening 9b and then diverges on opposite sides of the opening 9a to form corner portions 11 in which holes 12 are provided for receiving the ends of the guy rods.

Figures 6, 7:
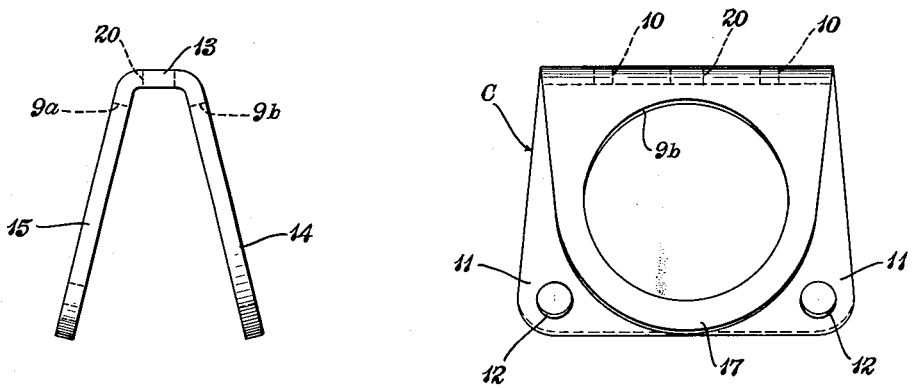
Fig. 6 is an end elevation of the plate after being bent to form the novel clamp.
Fig. 7 is a side elevation thereof.
Figure 4:
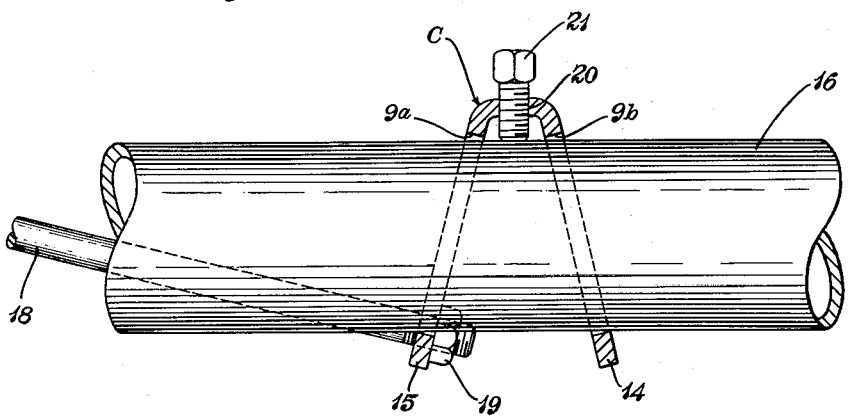
Fig. 4 is a still further enlarged sectional view of the clamp attached to the bracket arm of Fig. 3.

The plate 8 is bent along the lines y—y and z—z to the substantially V-shape shown in Fig. 6 having a relatively narrow substantially flat apex portion 13 and diverging legs 14 and 15, the leg 14 containing the opening 9b and the leg 15 containing the opening 9a. As indicated in Figs. 4, 5 and 6, each opening is disposed perpendicularly to the plane of its leg, so that while the inner edges of the openings 9a and 9b are aligned, the cylindrical walls of the openings are inclined with respect to a pipe bracket arms 16 passing through the openings. As shown in Fig. 7, the clamp is indicated generally at C, the holes 12 in the corner portions 11 are located on opposite sides of the curved peripheral portion 17 around the opening 9b, so that tie rods 18 secured in the holes 12 by nuts 19 are laterally spaced from the holes 9a and 9b and from the pipe 16 passing through said holes.

The central portion of the apex 13 of the clamp is drilled and tapped as indicated at 20 for receiving a set screw 21 which is adapted to abut the pipe bracket 16 passing through the opening 9a and 9b, as best shown in Fig. 4.

As shown in Figs. 3 and 4, the clamp C is slid over the end of the pipe bracket arm 16 before the lamp fixture indicated generally at 22 is attached to the arm by the bolt 23. When the clamp has been placed at the desired location along the arm, depending upon the diameter of the pole at the point where the rods 18 are connected thereto, and also depending upon the angle of the rods, the set screw 21 is screwed downwardly against the arm 16 to draw the clamp upwardly until the bottom outer edges of openings 9a and 9b engage the bottom of the pipe.

As the rods 18 are now tightened by screwing the nuts 19 (or similar nuts on their other ends), it will be seen that the leg 15 of the clamp tends to rock about the point of abutment between set screw 21 and pipe 16, and since the other leg 14 is securely held by the set screw at the top and by the engagement of the opening 9b at the bottom, the result of this tendency to rock is that the bottom outer edge of opening 9a digs into the bottom surface of the pipe. Obviously, the greater tension applied to the rods 18 the more tightly the outer edge of the opening 9a engages the pipe. As a consequence, there is no slippage of the clamp along the arm regardless of where the clamp is located and how smooth the surface of the arm is.

Obviously, within the scope of this invention, the arm may have a cross sectional shape other than circular and the openings 9a and 9b would be shaped to conform thereto.

As shown in Figs. 1 and 2, the novel clamp C may be used on a curved pipe bracket arm 16' extending laterally from a pole 25 and supporting a lamp fixture 22' at its outer end. In such case the guy rods 18 may be attached to the pole at a point below the level of the clamp C, whereas with the straight pipe arm 16 as in Fig. 3 they would be attached to the pole at a point above the level of the clamp. Otherwise conditions with the curved bracket arm are substantially identical to those present with the straight bracket arm.

As shown in Figs. 1 and 2, the guy rods 18 preferably diverge from the clamp C and are secured at their inner ends to the ends of a cross bar 26 by nuts 19'. The cross bar may be attached as by welding to one-half 27 of a two-part pole clamp of conventional construction, the other part 28 thereof being connected to the part 27 and the two parts clamped around the pole 25 by bolts 29 in a usual manner. It will be seen from Fig. 2 that if the location of the pole clamp 27, 28 is shifted up or down on the pole, or if the diameter of the pole 25 is materially changed, the location of the novel clamp C along the bracket arm must be changed while the length of the guy rods stays the same.

The present invention provides a novel one-piece clamp which is simple and inexpensive to construct and easily attached without special tools at any desired location along a bracket arm, the clamp being constructed so that no slippage occurs and the more the guy rods are tightened the tighter the clamp engages the arm.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiment of the improved construction illustrated and described herein is by way of example, and the scope of the present invention is not limited to the exact details of construction.

Having now described the invention, the construction, the operation and use of a preferred embodiment thereof, and the advantageous new and useful results obtained thereby; the new and useful constructions, and reasonable mechanical equivalents thereof obvious to those skilled in the art, are set forth in the appended claim.

I claim:

Bracket arm guy rod clamp construction comprising a bent V-shaped plate including an apex portion having diverging leg members extending therefrom, substantially aligned openings in said leg members, a bracket arm extending through said aligned openings, a set screw in said apex portion abutting the bracket arm, one of the leg members being provided with spaced openings in portions remote from the apex portion with one spaced opening on either side of the bracket arm, and guy rods connected through said spaced openings to said one leg member and extending angularly therefrom, means for tensioning the guy rods, said tensioned guy rods rocking said one leg about the point of abutment of the set screw with the bracket arm as a fulcrum and digging the opposite edge of the aligned opening of said one leg member into the surface of said bracket arm to tightly engage said V-shaped plate with said bracket arm.

References Cited in the file of this patent

UNITED STATES PATENTS

| | | |
|---|---|---|
| 214,281 | Crosby | Apr. 15, 1879 |
| 675,063 | Kift | May 28, 1901 |
| 888,332 | Inman | May 19, 1908 |
| 971,710 | Wertz | Oct. 4, 1910 |
| 1,073,874 | Smith | Sept. 23, 1913 |
| 1,505,220 | Shay | Aug. 19, 1924 |
| 1,523,042 | Thomas | Jan. 13, 1925 |
| 1,780,308 | Morris | Nov. 4, 1930 |
| 1,815,644 | Anderson | July 21, 1931 |
| 2,179,582 | Wiley | Nov. 14, 1939 |
| 2,216,886 | Langelier | Oct. 8, 1940 |